Oct. 10, 1950     H. C. GLITSCH     2,525,217
MANWAY CLAMP
Filed July 6, 1949
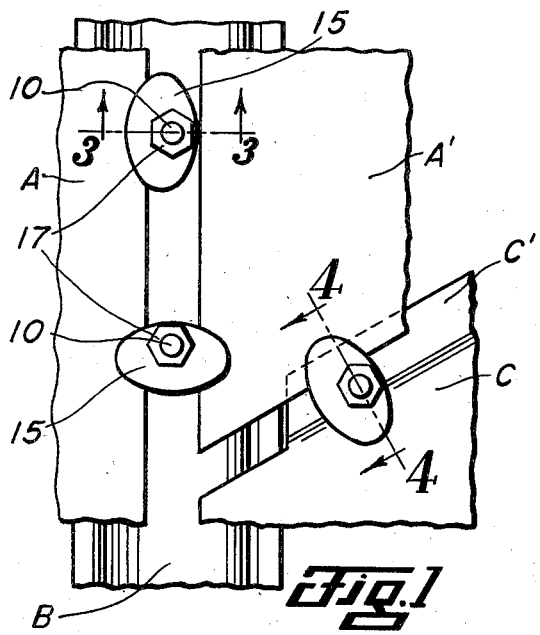
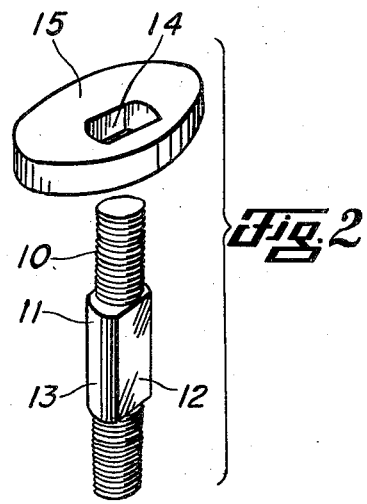
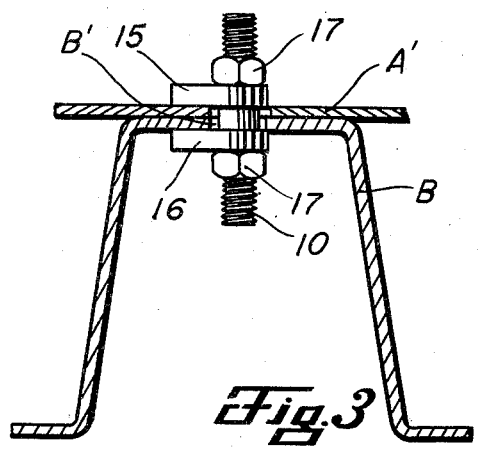
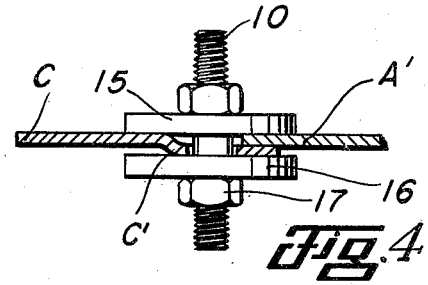
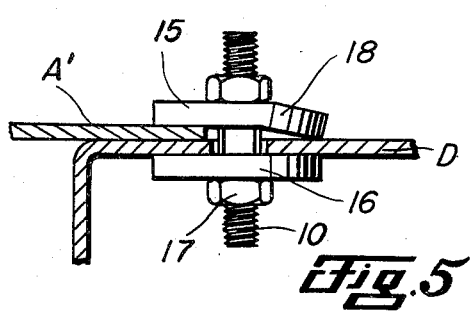
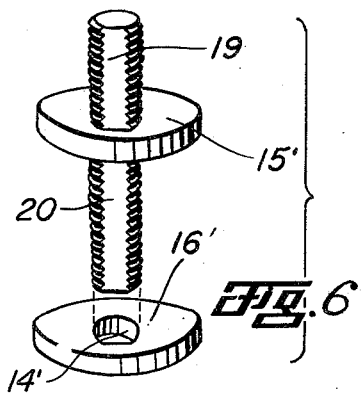
Hans C. Glitsch
INVENTOR.
BY Ashley & Ashley Patented Oct. 10, 1950

2,525,217

UNITED STATES PATENT OFFICE 2,525,217

MANWAY CLAMP

Hans C. Glitsch, Dallas, Tex., assignor to Glitsch Engineering Company, Dallas, Tex., a partnership Application July 6, 1949, Serial No. 103,307

7 Claims. (Cl. 292—256)

This invention relates to new and useful improvements in clamps.

One object of the invention is to provide an improved clamp particularly adapted for use with refinery manway covers.

Another object of the invention is to provide an improved clamp, including a stud bolt with a pair of spaced washers at least one of which is held against rotation thereon and eccentrically disposed on the bolt, so as to engage over the edge of a manway cover when the bolt is rotated and nuts on the bolt engaging the washers.

A further object of the invention is to provide a clamp including a flat-sided stud bolt having spaced washers confined thereon by nuts, each washer having a laterally offset slot having a flat side engaging the flat side of the bolt, whereby the washer is caused to rotate when the bolt is rotated.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a plan view of a portion of a refinery deck or floor with a manway cover held thereon by clamps constructed in accordance with the invention, Fig. 2 is an exploded view in perspective of the stud bolt and one of the washers, Fig. 3 is an enlarged transverse sectional view taken on the line 3—3 of Fig. 1, Fig. 4 is a similar view taken on the line 4—4 of Fig. 1, Fig. 5 is a transverse sectional view showing a modified form of clamp, and Fig. 6 is an exploded view of a modified form of bolt and washer.

In the drawings the numeral 10 designates a stud or headless bolt. The bolt has a medial enlargement or body 11 which has flat sides 12 and rounded ends 13. The body is adapted to fit snugly in a complementary slot or opening 14 in an elongate clamp washer 15. The slot 14 is offset laterally from the center of the washer and may be referred as eccentrically disposed.

While the clamp has various uses, it is especially designed for clamping the spaced edges of plates to supports. In Figs. 1 and 3 I have shown the clamp applied to the spaced edges of a plate A and a manway cover A' supported on a beam B, which latter has an opening B' therein, large enough to permit the body 11 to freely rotate therein. Two washers 15 and 16 are employed; said washers being duplicates.

The upper washer 15 overlies the adjacent edges of the plate A and the covers A' and the washer 16 engages the underside of the top of the beam 13. Nuts 17 screwed on the threaded ends of the bolt engage the washers. It will be observed from Fig. 3 that the body 11 is of such length as to cause its top and bottom to terminate within the slots 14 of the washers, whereby the nuts can be screwed against said washers and the parts clamped together.

By reason of the eccentric positioning of the slots, the bolt may be rotated 90° and brought to either of the positions shown at the left-hand side of Fig. 1. In the uppermost position the bolt has been rotated to bring the longitudinal axis of the washer 15, substantially parallel to the edges of the plates, whereby the washer overlies only one of the plates and the other plate is released. In the lower position the bolt has been rotated to cause the ends of the washer to overlie the edges of both the plate and the manway cover. This arrangement makes the clamp especially desirable for fastening manways.

In Fig. 4, the plate or tray C has a depressed marginal flange C' which supports the edge portion of the manway cover A'. In this form the washer 16 bears against the underside of the flange in which the opening B' is formed. By loosening one of the nuts 17 the bolt 10 may be rotated to move the washers 90° and release the cover A'. In Fig. 5, the manway cover A' is supported on a flanged deck plate D and the opening B' is provided in the latter. One end portion 18 of the upper washer 15 is bent down so as to engage the deck plate. Fig. 6 illustrates a modified form of clamp which includes a continuously screw-threaded stud bolt 19 having a longitudinal panel 20 cut out of its threads, thus giving the bolt a flat side. A pair of washers 15' and 16' similar to the washers 15 and 16 are employed and each has an eccentric slot 14', which differs from the slot 14 in that it has only one flat side so as to receive the bolt 19.

The clamp is simple and inexpensive. While the body 11 and the threaded portions of the bolts will slide through the slots 14 and 14', the flat sides will cause the washers to rotate when the bolts are rotated. These clamps are advantageously used in refinery towers. Since the nuts 17 are accessible above and below the plates and covers, either nut may be loosened from above or below, and thus, the clamp may be likewise loosened or fastened.

While it might be possible to alter the structure of the washer 16, the elliptical shape and eccentric slot are very useful. The washers are mounted on the body 11 in complementary relation and thus whether a workman is above the cover A' or below it, he can tell at a glance whether the clamp is fastened or unfastened.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A clamp including, a stud bolt, nuts on each end of the bolt, said bolt having a flat side exposed between the nuts, and a pair of washers mounted on the bolt between the nuts, each washer having an eccentrically disposed slot through which the bolt passes and each slot having a flat side engaging the flat side of the bolt, whereby the washers are rotated when the bolt is rotated.

2. A clamp including, a stud bolt, a pair of washers free to move longitudinally on the bolt and held against independent rotation on said bolt, and a pair of nuts mounted on the bolt and engaging the washers.

3. A clamp as set forth in claim 2, wherein each washer is eccentrically disposed on the bolt.

4. A clamp including, a stud bolt having an enlarged, flat-sided body at its medial portion, a pair of washers each having a flat-sided slot receiving the body of the bolt, and a pair of nuts screwed onto the bolt and engaging the washers.

5. A clamp as set forth in claim 4, wherein the slot of each washer is offset from the center thereof.

6. A manway cover clamp including, a plate, a cover having its edge spaced from the plate, a stud bolt mounted outside the edge of the cover and having a flat side, washers on the bolt engaging the upper and lower sides of said plate and cover, each washer having a flat-sided slot disposed eccentrically therein and receiving the flat side of the bolt, and nuts on the bolt engaging the washers, said washers being rotatable by the bolt to release the cover.

7. A clamp including, a stud bolt, nuts on each end of the bolt, and a pair of spaced washers mounted on the bolt between the nuts, the bolt having a flat side exposed between the nuts, at least one of said washers having an eccentrically disposed slot through which the bolt passes and a flat side engaged by the flat side of the bolt.

HANS C. GLITSCH.

No references cited.